US 6,732,981 B2

(12) United States Patent
Franks et al.

(10) Patent No.: US 6,732,981 B2
(45) Date of Patent: May 11, 2004

(54) DROP WIRE CLAMP (75) Inventors: George J. Franks, Inverness, IL (US); Isaac Jack Sachs, Montreal (CA)

(73) Assignee: Senior Industries, Inc., Wood Dale, IL (US)

( * ) Notice: Subject to any disclaimer, the term of this patent is extended or adjusted under 35 U.S.C. 154(b) by 0 days.

(21) Appl. No.: 10/225,923

(22) Filed: Aug. 22, 2002

(65) Prior Publication Data

US 2004/0035984 A1 Feb. 26, 2004

(51) Int. Cl.⁷ .................................................. F16L 3/12
(52) U.S. Cl. ........................................ 248/74.1; 248/58
(58) Field of Search ............................... 248/58, 62, 63, 248/74.1, 74.3, 505; 24/129 B, 129 R (56) References Cited

U.S. PATENT DOCUMENTS

| 116,632 | A | | 7/1871 | Riley | |
|---|---|---|---|---|---|
| 1,205,496 | A | * | 11/1916 | Whitehead | ................. 24/129 R |
| 1,390,152 | A | * | 9/1921 | Miltner | ..................... 24/129 R |
| 1,793,140 | A | | 2/1931 | Steinmayer | |
| 1,859,561 | A | | 5/1932 | Haworth | |
| 2,076,359 | A | | 4/1937 | Bay | |
| 2,131,171 | A | | 9/1938 | Fotsch | |
| 2,247,867 | A | * | 7/1941 | Baumann | ..................... 224/258 |
| 2,418,885 | A | * | 4/1947 | Houston | ................... 24/129 B |
| 2,466,083 | A | * | 4/1949 | Crosby | ..................... 24/129 B |
| 2,481,610 | A | * | 9/1949 | Meighan | ................... 24/129 R |
| 2,781,212 | A | | 2/1957 | Jugle | |
| 3,309,475 | A | * | 3/1967 | Gintz | ................. 200/61.58 R |
| 3,629,909 | A | | 12/1971 | Riley | |
| 3,960,461 | A | | 6/1976 | Sachs | |
| 4,407,471 | A | | 10/1983 | Wilmsmann et al. | |
| 4,461,059 | A | | 7/1984 | Bury | |
| 4,477,948 | A | | 10/1984 | Sachs | |
| 4,592,117 | A | | 6/1986 | Ruehl et al. | |
| 4,637,098 | A | | 1/1987 | Okura et al. | |
| 4,738,006 | A | * | 4/1988 | Juarez | ....................... 24/115 A |
| 4,939,821 | A | | 7/1990 | Frank, Jr. | |
| 5,050,273 | A | * | 9/1991 | Okura | ....................... 24/136 R |
| 5,142,745 | A | | 9/1992 | Setty et al. | |
| 5,209,439 | A | | 5/1993 | Coll | |
| D342,439 | S | | 12/1993 | Sachs | |
| D342,664 | S | | 12/1993 | Sachs | |
| D344,445 | S | | 2/1994 | Sachs | |
| 5,322,132 | A | | 6/1994 | Franks, Jr. | |
| 6,401,309 | B1 | * | 6/2002 | Yang | ........................... 24/130 |

FOREIGN PATENT DOCUMENTS

| CA | 460649 | 10/1949 |
|---|---|---|
| GB | 747691 | 4/1956 |

OTHER PUBLICATIONS

Thomas & Betts "Product Handbook" (1998) (pp. cover, 1, 20–23, 110–119, 142 and 143).
Sachs Communications product brochures (1995) (pp. cover, 2, 3, 30–33, 40, 41, 44–47, 56–59, 70, 71 and 104B–107).
Sachs Canada, Inc., product literature entitled "DH–1" (1991) (1 page.).
Sachs Canada, Inc., product literature entitled "Dead–End House Attachment" (1991) (1 page).

(List continued on next page.)

Primary Examiner—Ramon O. Ramirez
Assistant Examiner—Kofi Schulterbrandt
(74) Attorney, Agent, or Firm—Fitch, Even, Tabin & Flannery (57) ABSTRACT

A clamp designed to accept and secure a cable with a securing wire. The clamp has a body portion that utilizes a plurality of slots designed and oriented to accept and guide the securing wire in a wrapping procedure. The permissible wrapping procedure allows the user to hold the clamp with one hand and wrap the support wire with the other, without alternating the clamp and wire between hands and without encircling the body portion.

8 Claims, 4 Drawing Sheets

OTHER PUBLICATIONS

Sachs Canada, Inc., product literature entitled "Sax Info Industry & Product News" for "Universal Messenger Drop Clamp SC02MFA" (1993) (1 page).

Sachs Canada, Inc., product literature entitled "SC02MFA Drop Clamp Application" (1993) (1 page).

Diamond/Sachs Commmunications Inc. product literature entitled "SC02MFA–2SS Application Procedures" (date prior to Aug. 22, 2001) (1 page).

Sachs Canada, Inc., product literature entitled "SC02MF Messenger Drop Clamp Application" (1991) (1 page).

Sachs Canada, Inc., product literature entitled "SC02 Non Messenger Drop Clamp Application" (1991) (1 page).

Sachs Communications, Inc., product literature entitled "Universal Drop Wire Clamp SC02–TAC"(date prior to Aug. 22, 2001) (1 page).

Sachs product literature entitled "SC02–TAC Application" (date prior to Aug. 22, 2001) (1 page).

Sachs Canada, Inc., product literature entitled "DH–13" (1991) (1 page).

Sachs Canada, Inc., product literature entitled "Application Sheet AS3/AS4" (1991) (1 page).

Sach Canada, Inc., product literature entitled "Sachs Drop Suspension System" (1993) (1 page).

Senior Industries product literature entitled "Drop Wire Clamps" (date prior to Aug. 22, 2001).

Senior Industries product literature entitled "Station Ground Clamp–Drop Wire Clamp" (date prior to Aug. 22, 2001) (1 page).

* cited by examiner

DROP WIRE CLAMP

FIELD OF THE INVENTION

The present invention is directed to a drop wire clamp for suspending and directing a cable and, more particularly, to an improved drop wire clamp for more efficiently and effectively suspending and directing a double stranded cable.

BACKGROUND OF THE INVENTION

Various types of clamps are employed to support and direct cables extending between supports and structures, such as from a utility pole to a building. One common type of clamp is referred to as drop-wire clamps. Such clamps are typically used with cables having two strands, a signal carrying strand and a support strand (also referred to as a messenger wire). A drop-wire clamp allows a cable, such as coaxial cable, to be supported and attached to a building, pole, or other support wire in a manner that lessens compromise to the signal transmission capability of the cable. The drop-wire clamp also is advantageous because it supports the weight of the cable and maintains tension on the line while relieving stress on the attachment points, such as at the attachment juncture with a pole or building.

Drop-wire clamps tend to fall into two general categories: (1) a wire wrap type; and (2) a compression type. With the first category, a portion of the messenger strand is separated from the signal carrying strand and wrapped around the clamp to secure the cable to the clamp. With the second category, the cable is secured to the clamp through pressure. In either design, it is critical that the clamp does not degrade the signal quality by damaging either the signal carrying cable or its insulation.

More specifically, with the first category, the drop-wire clamp utilizes a trough that accepts the signal-carrying strand. The trough is generally wider than the cable so as to receive it with a loose fit and, thus, avoid signal effecting damage to the signal carrying strand. Due to the loose fit between the signal carrying strand and the trough, the messenger wire is employed to secure the signal carrying strand in the trough of the clamp. Typically, these clamps have notches on the sides so that the wire is wrapped transversely about the clamp and is maintained in place by the notches or slots. This wrap holds the signal carrying strand in the clamp. Examples of prior wire wrap-type clamps are disclosed in U.S. Pat. Nos. 5,209,439 and D342,664.

A shortcoming with the wire wrap-type clamps, including those disclosed in U.S. Pat. Nos. 5,209,439 and D342,664, is that the user must alternate between hands when wrapping the messenger were transversely around the trough and/or constantly remove the hand from the messenger wire to grab the messenger wire on the other side of the cable and clamp to complete the transverse wrap. More specifically, for example, one hand is used to hold the clamp, while the other hand is used wrap the messenger wire part way around the clamp. The user must then switch hands to complete the wrap, i.e., the other hand is used to grasp the clamp while the first hand is used to complete the wrap. This hand alternating procedure is duplicated for each wrap and, thus, can include anywhere from one to four wraps, depending on the desired number of wraps. Although the wire wrap-type clamps address the issue of damage to the signal-carrying wire because of the loose fit between the trough and the wire, it has been found to be cumbersome, time consuming and overall more complicated than desired.

Another known shortcoming with the wire wrap-type clamps is the inflexibility with the manner in which the messenger wire can be wrapped about the trough to secure the signal carrying wire. That is, the design and positioning of the notches and slots commonly dictate only one wrapping pattern for the messenger wire.

With the second category, the drop-wire clamp secures the cable using compression. Compression designs may or may not use a trough to accept the signal-carrying wire, but the distinguishing feature of these clamps is that the signal-carrying wire is typically held to the clamp through some type of compressive force or pressure on the wire. Examples of this type of design are disclosed in U.S. Pat. Nos.: 3,960,461; 4,461,059; and 4,592,117.

For example, U.S. Pat. No. 3,960,461 discloses a clamp with two concentric cones that sandwich the cable. More specifically, a cable sits in a grove along the exterior of an inner cone and an outer cone or sleeve is slid over the inner cone. Due to the cone shaped surfaces, the cable is sandwiched under compressive pressure. U.S. Pat. No. 4,461,059 discloses a clamp with a trough that accepts the cable; however, the cable is secured in the trough under pressure of several rib members or fins. U.S. Pat. No. 4,592,117 discloses a clamp body that receives a wedge piece that contains a channel for accepting the cable. With the cable sitting in the channel of the wedge piece, it is then slid into the clamp. The cable is secured therein through pressure between the clamp and wedge piece.

Although these compression-type designs may eliminate the complicated wrapping procedure, one known shortcoming is that they may cause damage to the cable through the pressurized contact used to secure the cable to the clamp. This result is also known to disturb the spacing between the core wire and shielding braid.

Thus, there is desired an improved drop-wire clamp that includes the benefits of the wire wrap-type design to minimize damage to the signal-carrying wire, but also allows the cable to be secured into the clamp without complicated messenger wire wrapping procedures.

SUMMARY OF THE INVENTION

There is provided a clamp for supporting a cable. The clamp includes a body portion having a longitudinal axis and a wall terminating with a pair of distal end edges, a pair of spaced side edges and transitional edges between the end and side edges. The wall defines a cavity capable of receiving a cable, and the edges define a plurality of slots generally oriented in the direction of the longitudinal axis and located generally adjacent the transitional edges. A hanger portion is provided to the clamp to mount and support the body portion.

Each of the distal edges may define at least one slot opening in the direction of the longitudinal axis and located generally adjacent one of the transitional edges. One of the distal end edges also may define at least two slots opening in the direction of the longitudinal axis, and each of the at least two slots are located generally adjacent one of the transitional edges. At least one of the side edges may define a slot with a major portion extending in the direction of the longitudinal axis. The hanger portion may be integral with the body portion.

Further, there is a device for securing to a cable with a wound wire so to support the cable in suspension. The device includes a body having a pair of sides and a back interconnecting the sides. The sides and back define an elongated trough with a longitudinal axis and an opening for receiving a cable to be supported. The sides define a plurality of slots opening generally along the direction of the longitudinal axis to support wrapping of a securing wire so that it extends across the opening of the trough to secure a cable in the trough. The device also includes a hanger extending from the body portion.

The trough may also have a longer length than width, and the slots for wrapping a securing wire may be a plurality of notches that are oriented generally along the length of the trough. The body and hanger may be integral.

In addition, there is an apparatus for holding a double-stranded cable, which includes a support strand and a signal-carrying strand. The apparatus includes a hanger portion and a body portion that is capable of accepting a double-stranded cable. The body portion includes a pair of sides and a back that define a trough with an opening through which a cable can be inserted into the trough. The trough has a longer length than width for holding in a generally loose manner the cable. The sides have edges that define at least three slots that are each horizontal to the length of the trough and oriented so that a support strand can be wound around the opening of the trough without encircling the body portion around the sides and the back.

The slots may open longitudinally with the trough. The hanger portion and the body portion may be integral with one another.

There is also a method to secure a double-stranded cable, which includes a signal-carrying strand and a support strand, to a clamp, that has a body portion and a hanger portion and contains a trough with an opening. The method includes separating a length of the support strand from the signal-carrying strand, holding the body portion of the clamp with one hand and inserting the double-stranded cable into the trough through the opening. The other hand is used to complete a wrapping procedure that extends the separated support wire through a plurality of notches in the body about the trough without alternating the body portion between hands. This closes off the opening of the trough such that the signal-carrying cannot release from the trough and that does not encircle the body portion around the sides and the back of the trough.

DETAILED DESCRIPTION OF THE PREFERRED EMBODIMENT

Figure 1:
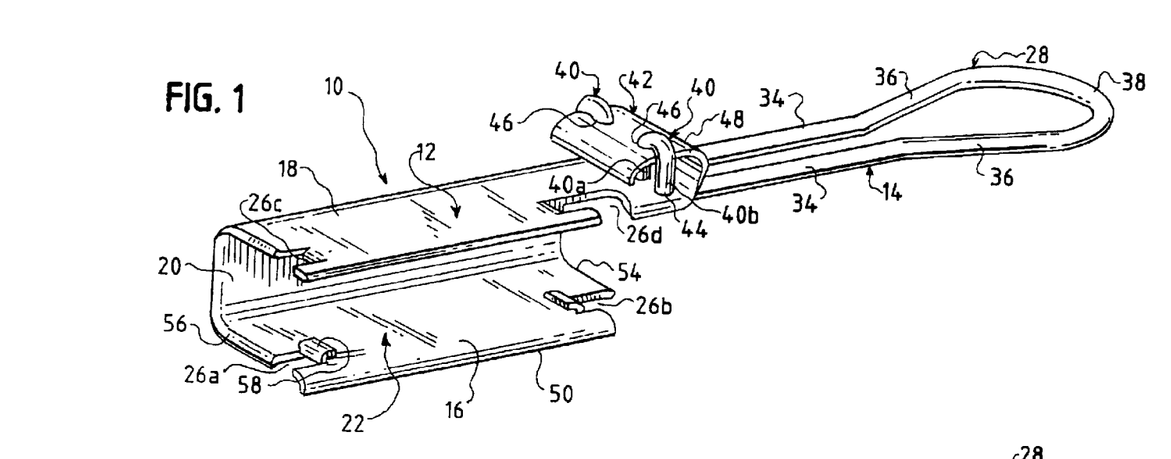
FIG. 1 is a perspective view of a two-piece drop-wire clamp embodying features of the present invention.
Figure 2:
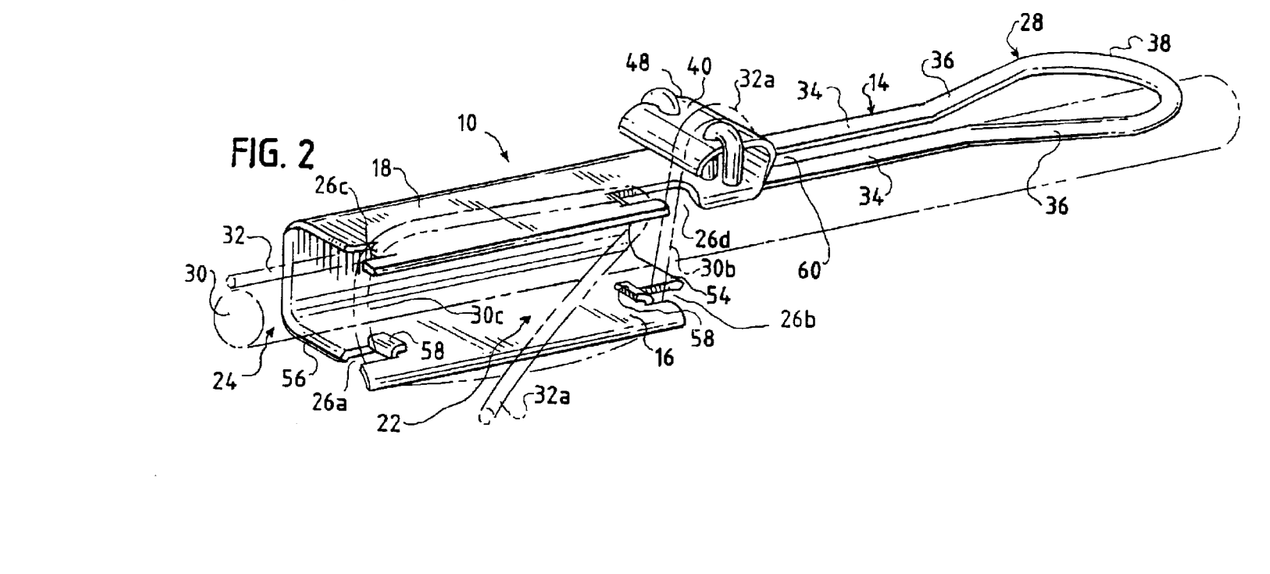
FIG. 2 is a perspective view of the drop-wire clamp of FIG. 1 illustrating attachment to a double-stranded cable.
Figure 3:
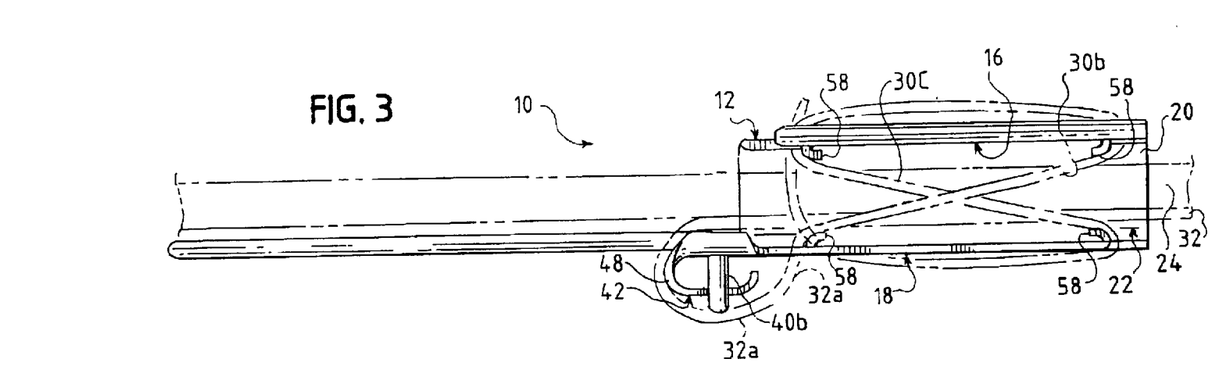
FIG. 3 is a side elevational view of the drop-wire clamp of FIG. 1 illustrating an alternate attachment to a double-stranded cable.

Referring to FIGS. 1–3, there is illustrated a clamp 10 having two pieces, a body 12 and a wire hanger or bail 14. The body 12 includes a first elongated side wall 16 and a second elongated side wall 18 interconnected by an elongated base wall 20. The walls 16, 18, 20 define a cavity or trough 22 that is sized to accept in a generally loose fitting fashion a conventional signal-carrying cable 24. The first side wall 16 includes a rear notch 26a and a front notch 26b. The second side wall 18 includes a rear notch 26c and may include an optional front notch 26d. The notches 26a–c (and 26d when present) open in a direction designed to facilitate expeditious and effective securement of the cable 24 in the clamp 10. The wire hanger 14 includes a loop 28 that enables the clamp 10 to be easily suspended from a hook or other conventional attachment to structure, such as a pole or building.

More specifically, the clamp 10 can be employed to support and direct, in a suspended fashion, cabling (such as cabling in the form of coaxial cable 24 for community antenna television (CATV)) running between structures, including from pole to pole or from a pole to a building, such as a residence. The cable 24 is a double-stranded cable with a signal-carrying wire 30 and an attached support wire or messenger wire 32. To attach the cable 24 to the clamp 10, a portion 32a of the messenger wire 32 is separated from the signal carrying wire 30. The trough 22 of the clamp 10 receives the cable 24 (both the signal-carrying wire 30 and the messenger wire 32), and the separated portion 32a of the messenger wire 32 is used to close off the opening of the trough 22 to secure the cable 24 in the trough 22.

To secure the opening of the trough 22, the separated portion 32a of the messenger wire 32 is wound around the body 12 using the notches 26a–c (and 26d when present) to maintain its position relative to the body 12. Due to the positioning, orientation and configuration of the notches 26a–c, the winding of the separated messenger wire portion 32a can be accomplished quickly and efficiently without having to shift the clamp 10 and wire portion 32a from hand-to-hand. Moreover, as discussed herein, a variety a winding patterns between the separated messenger wire portion 32a and the notches 26a–c (and notch 26d if present) can be employed in securing the cable 24 in clamp 10. It is also noted that the clamp 10 can be used to secure a single-strand cable by way of a completely and originally separate securing wire used to wind around the body to seal off the trough.

Use of the clamp 10 to secure the cable 24 to a structure relieves stress from any connection between the cable and a structure (such as a pole or building), while also leaving sufficient tension on the ariel span. The features of the present invention as embodied in the clamp 10 also provide a simple method to attach the cable to the pole and/or to alter the direction of the cable with minimal tension or stress on the line. Any type of hook, eyelet, bracket or any other conventional attachment structure can be employed to attach the clamp 10 to a structure. In addition, the clamp 10 may also be used to attach a cable mid-span to a support wire that spans between structures, such as between poles or a pole and building.

The wire hanger 14 extends from the front of the body 12 and consists of two parallel extensions 34 that terminate at the loop 28. The loop 28 consists of two outward flared extensions 36 and an interconnecting arcuate portion 38. To attach the wire hanger 14 to the body 12, the end portions 40 of each extension 34 are looped into and around a forward portion 42 of the body 12 rolled backwards toward the rear of the body 12. More specifically, each end 40 is bent so that a first end segment 40a extends through two aligned holes 44 and 46, and a second end segment 40b is bent to extend around and outside the body 12 to be generally parallel to the first end segment 40a. This is the same for the end portions 40 of each extension 34.

The wire hanger should be sized sufficiently large enough for convenient attachment. For example, the wire hanger may extend from the body two to three inches. The radius of curvature of the arcuate portion may be about being about 0.375 inches to 0.500 inches. The wire hanger may be constructed of any suitable material with the required tensile strength for the desired application. For example, for supporting a common coaxial cable for CATV, the wire hanger material can be 0.80 inch diameter 300 series stainless steel wire.

As mentioned above, the body 12 includes the first side wall 16 and the second side wall 18, which are interconnected by the base wall 20 to from the trough 22 that receives the cable 24. The trough 22 has an elongated shape that is longer than its opening through which the cable 24 is inserted into the trough 22. The walls 16, 18 and 20 are generally parallel and perpendicular to one another. The trough 22 is to be sized large enough to receive a cable in a loose fashion so as not to damage or otherwise effect the signal-carrying ability of the cable. For example, the depth of the trough may be in the approximate range of 0.600 inches to 1.350 inches, the width may be in the approximate range of 0.400 inches to 0.600 inches, and the length may be in the approximate range of 1.50 inches to 2.80 inches.

The first side wall 18 extends forward beyond the trough 22 to form the roll-over extension 42 used to attach the wire hanger 14. More specifically, the roll-over extension 42 curves back towards the body 12 to form a loop outside the trough 22. The loop can take on any cross-section, such as generally rectangular, generally oval or circular and can have a variety of radius of curvatures, including, for example, in the approximate range of 0.050 inches to 0.280 inches.

As mentioned above, the roll-over extension 42 defines holes 46 on the outer side of the loop and holes 44 on the inner side of the loop. The holes 44 and 46 are designed to receive the first end segments 40a of the end portions 40 of the extensions 34 of the wire hanger 14. The roll-over extension 42 includes an outer arcuate surface 48 that guides the separated portion 32a of the messenger wire 32 from the signal-carrying wire 30 back around to be wound about the body 12 using the notches 26a–c (and notch 26d when present) to secure the cable 24 in the trough 22.

The elongated opening of the trough 22 is bounded by a first elongated side edge 50 of the first side wall 16 and a second elongated side edge 52 of the second side wall 18. The first elongated edge 50 is curved outward from the trough 22. This outward curvature assists in inserting the cable 24 into the trough 22 and in winding, locating and securing the separated portion 32a of the messenger wire 32. The second elongated edge $5^2$ may be in the same plane as the second side wall 18 or can also be curved outward for the same reasons. The radius of curvature may any suitable dimension, including, for example, in the approximate range of 0.150 inches to 0.240 inches.

The ends of the trough 22 are bounded by front edge 54 and rear edge 56. The front edge 54 traces the front end of the trough 22 at the first and base walls 16 and 20 and curves outward from the trough. The rear edge 56 traces the rear end of the trough 22 at the first, second and base walls 16, 18 and 20 and also curves outward from the trough 22. The end edges 54 and 56 are curved so as to minimize potential for damage to the cable. The degree curvature of curvature can be any acceptable amount, including, for example, in the approximate range of 0.075 inches to 0.120 inches.

The front edge 54 defines one notch 26b in the first side wall 16 adjacent the first elongated side edge 50 of the first side wall 16. The rear edge 56 defines one notch 26a in the first side wall 16 adjacent the first elongated side edge 50 of the first side wall 16 and another notch 26c in the second side wall 18 adjacent the second elongated side edge 52 of the second side wall 18. Each of these notches 26a–26c are sized sufficiently large enough to receive at least two windings of a conventional messenger or other securing wire and have a slightly rectangular shape extending longitudinally. For example, the width (including the opening) may be approximately 0.150 inches, and the length may be in the approximate range of 0.160 inches to 0.500 inches.

In addition, when present, the side edge 52 defines the front notch 26d in the second side wall 18 adjacent the rear portion of the hanger 14. If the optional notch 26d is present, it should also be sized appropriately to receive at least two windings of a conventional messenger or other securing wire. Although not necessary, the notch 26d preferably has an "L" shape with the major portion extending longitudinally, for example, with a length of approximately 0.160 inches and a width of about 0.150 inches.

Each of the notches 26a–c (and notch 26d when present) includes an arcuate flange 58 at its end that curves inward into the trough 22 and longitudinally along the elongated direction of the body 12. The flanges 58 guide the separated messenger or other securing wire 32a through the notches 26a–c (and notch 26d when present) and provide a smooth surface upon which to wind the wire so as not to damage the wire. The flange may be formed of material cut to form the notch and rolled back over into the trough. The flanges may be curved back inward at any suitable radius of curvature, including for example in the approximate range of 0.040 inches to 0.070 inches. The body of the clamp may be constructed of any suitable material, such as, for example, 0.032 inch stainless steel or 0.50 inch 6061 aluminum.

In FIG. 2, an exemplary winding pattern is shown for the separated messenger wire 32a to secure the cable 24 in the trough 22 of the clamp 10. As mentioned above, the cable 24 is double-stranded with a larger diameter signal-carrying wire 30 and the attached smaller diameter support and/or messenger wire 32. To utilize the clamp 10, the portion 32a of the messenger wire 30 is separated from the signal carrying wire 30. Then, the cable 24 adjacent the separated messenger wire portion 32a is inserted into the trough 22. Next, the separated messenger wire 32a is threaded through a gap 60 located between the parallel wire extensions 34 and encircled around the rolled extension 42 over the arcuate surface 48 back toward the body 12. Finally, the messenger wire 32a is wound along the body portion 12 of the clamp using the notches 26a–c (and notch 26d when present). Any pattern of winding can be employed at the users preference.

The winding pattern should include at least one segment that extends across the opening of the trough 22. More specifically, the wrapping procedure, when complete, will preferably cross the opening of the trough 22 in multiple locations. For example, FIG. 2 illustrates a configuration in which the separated messenger wire 32a has two segments 30b and 30c that cross the trough 22 in two different places perpendicular to the longitudinal axis of the body 12 and trough 22. In FIG. 3, there is illustrated another wrapping pattern for the separated messenger wire 32a in which portions 30b and 30c crisscross one another across the opening of the trough 22. Although FIGS. 2 and 3 illustrate wrapping patterns for the separated messenger wire, other patterns are certainly possible, and such configurations may result in more or less locations of the separated messenger wire crossing the trough.

A benefit of a clamp embodying features of the present invention is the convenient and effective winding of the separated messenger or other securing wire without having to shift the clamp from hand to hand. More specifically, the body of the clamp can be held in one hand while the complete winding of the separated messenger wire can be done with the other hand. For example, the body 12 can be held in the left hand with the thumb on the second side wall 18 and the other fingers on the first side wall 16. The separated messenger wire 30a can be wound around the body 12 at the notches 26a–c (and notch 26d when present) in a generally counter-clockwise direction with the right hand. The hands also can be reversed. That is, the body 12 can be held by the right hand with the thumb on the first side wall 16 and the other fingers on the second side wall 18, and the winding can be done by the left hand in a generally counter clockwise direction.

Figure 4:
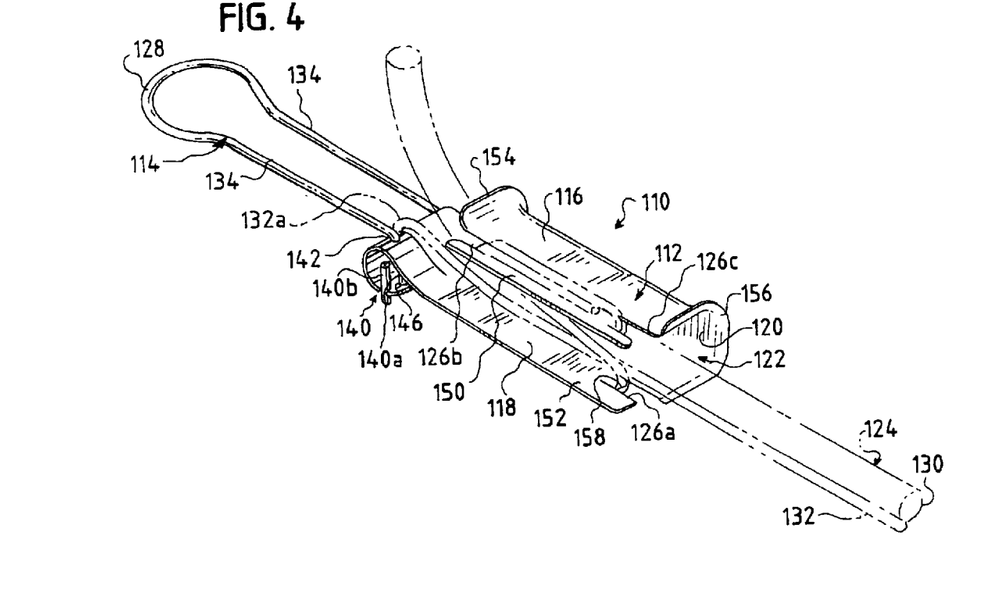
FIG. 4 is a perspective view of another two-piece drop-wire clamp embodying features of the present invention illustrating attachment to a double stranded cable.
Figure 5:
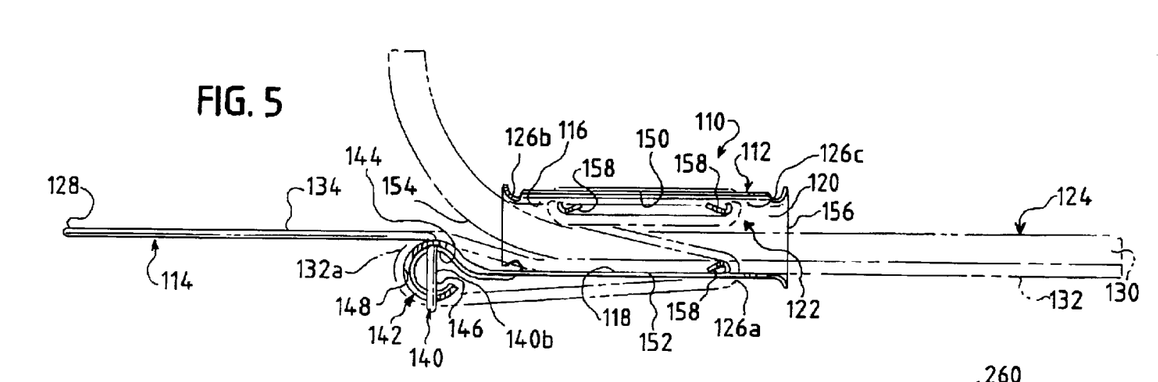
FIG. 5 is a side elevational view of the drop-wire clamp of FIG. 4 illustrating attachment to a double-stranded cable.

Referring to FIGS. 4 and 5, another two-piece clamp 110 is illustrated embodying features of the present invention. The clamp 110 is similar to the previously discussed clamp 10 with a few minor variations as are evident from the figures. The clamp 110 includes a body 112 and a wire hanger 114. The body includes a first elongated side wall 116 and a second elongated side wall 118 interconnected by an elongated base wall 120. The walls 116, 118, 120 define a cavity or trough 122 that is sized to accept in a generally loose fitting fashion a conventional signal-carrying cable 124. The first side wall 116 includes a rear notch 126c and a front notch 126b. The second side wall 118 includes a rear notch 126a. The notches 126a–c open in a direction designed to facilitate expeditious and effective securement of the cable 124 in the clamp 110. The wire hanger 114 includes a loop 128 that enables the clamp 110 to be easily suspended from a hook or other conventional attachment to structure, such as a pole or building.

More specifically, the clamp 110 can be employed to support and direct, in a suspended fashion, the cable 124, which can be a double-stranded cable with a signal-carrying wire 130 and an attached support wire or messenger wire 132. To attach the cable 124 to the clamp 110, a portion 132a of the messenger wire 132 is separated from the signal carrying wire 130. The trough 122 of the clamp 110 receives the cable 124 (both the signal-carrying wire 130 and the messenger wire 132), and the separated portion 132a of the messenger wire 132 is used to dose off the opening of the trough 122 to secure the cable 124 in the trough 122.

To secure the opening of the trough 122, the separated portion 132a of the messenger wire 132 is wound along the body 112 using the notches 126a–c to maintain its position relative to the body 112. Due to the positioning, orientation and configuration of the notches 126a–c, the winding of the separated messenger wire portion 132a can be accomplished quickly and efficiently without having to shift the clamp 110 and wire portion 132a from hand-to-hand. Moreover, as discussed above, a variety a winding patterns between the separated messenger wire portion 132a and the notches 126a–c can be employed in securing the cable 124 in clamp 110.

The wire hanger 114 extends from the front of the body 112 and consists of two parallel extensions 134 that terminate at the loop 128. To attach the wire hanger 114 to the body 112, the end portions 140 of each extension 134 are looped into and around a forward portion 142 of the body 112 rolled backwards toward the rear of the body 112. More specifically, each end 140 is bent so that a first end segment 140a extends through two aligned holes 144 and 146, and a second end segment 140b is bent to extend around and outside the body 112 to be generally parallel to the first end segment 140a. This is the same for the end portions 140 of each extension 34.

As mentioned above, the body 112 includes the first side wall 116 and the second side wall 118, which are interconnected by the base wall 120 to form the trough 122 that receives the cable 124. The trough 122 has an elongated shape that is longer than its opening through which the cable 124 is inserted into the trough 122. The walls 116,118 and 120 are generally parallel and perpendicular to one another. As mentioned above, The trough 122 is to be sized large enough to receive a cable in a loose fashion so as not to damage or otherwise effect the signal-carrying ability of the cable.

The first side wall 118 extends forward beyond the trough 122 to form the roll-over extension 142 used to attach the wire hanger 114. More specifically, the roll-over extension 142 curves back towards the body 112 to from a loop outside the trough 122. The loop can take on any cross-section, and as illustrated has s circular cross-section.

As mentioned above, the roll-over extension 142 defines holes 146 on the outer side of the loop and holes 144 on the inner side of the loop. The holes 144 and 146 are designed to receive the first end segments 140a of the end portions 140 of the extensions 134 of the wire hanger 114. The roll-over extension 142 includes an outer arcuate surface 148 that guides the separated portion 132a of the messenger wire 132 from the signal-carrying wire 130 back around to be wound about the body 112 using the notches 126a–c to secure the cable 124 in the trough 122.

The elongated opening of the trough 122 is bounded by a first elongated side edge 150 of the first side wall 116 and a second elongated side edge 152 of the second side wall 118. The first elongated edge 150 is curved outward from the trough 122. This outward curvature assists in inserting the cable 124 into the trough 122 and in winding, locating and securing the separated portion 132a of the messenger wire 132. The second elongated edge 152 may be in the same plane as the second side wall 118 or can also be curved outward for the same reasons.

The ends of the trough 122 are bounded by front edge 154 and rear edge 156. The front edge 154 traces the front end of the trough 122 at the first and base walls 116 and 120 and curves outward from the trough 122. The rear edge 156 traces the rear end of the trough 122 at the first, second and base walls 116, 118 and 120 and also curves outward from the trough 122. The end edges 154 and 156 are curved so as to minimize potential for damage to the cable.

The front edge 154 defines one notch 126b in the first side wall 116 adjacent the first elongated side edge 150 of the first side wall 116. The rear edge 156 defines one notch 126c in the first side wall 116 adjacent the first elongated side edge 150 of the first side wall 116 and another notch 126a in the second side wall 118 adjacent the second elongated side edge 152 of the second side wall 118. Each of these notches 126a–126c are sized sufficiently large enough to receive at least two windings of a conventional messenger or other securing wire and have a slightly rectangular shape extending longitudinally.

Each of the notches 126a–c includes an arcuate flange 158 at its end that curves inward into the trough 122 and longitudinally along the elongated direction of the body 112. The flanges 158 guide the separated messenger or other securing wire 132a through the notches 126a–c and provide a smooth surface upon which to wind the wire so as not to damage the wire.

Figure 6:
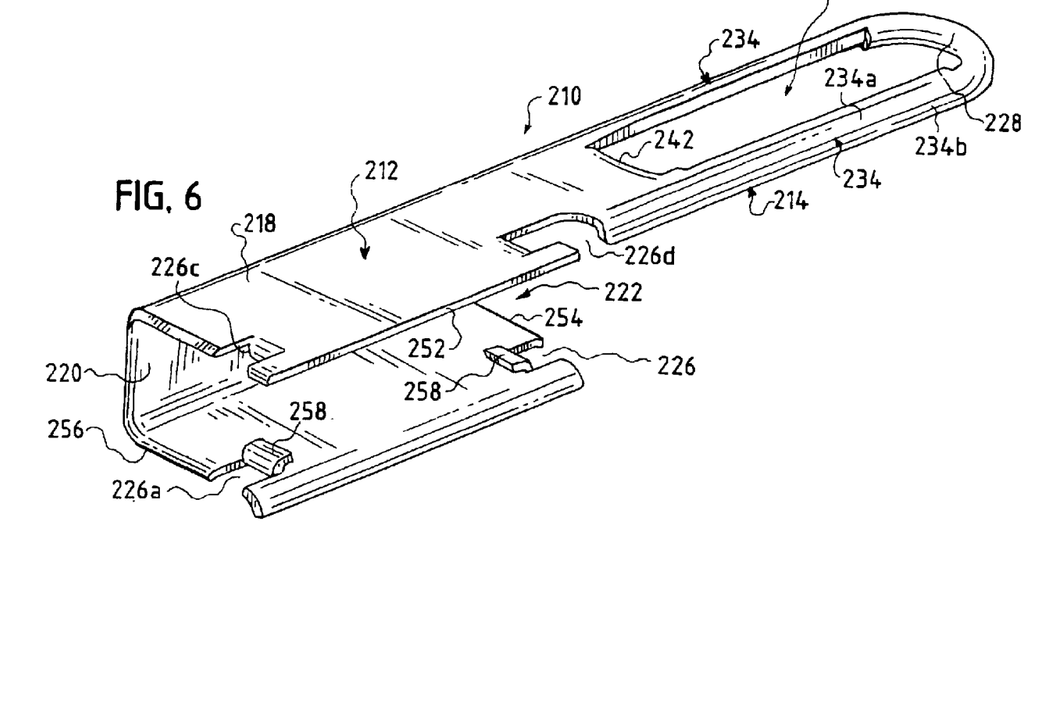
FIG. 6 is a perspective view of a one-piece drop-wire clamp embodying features of the present invention.
Figure 7:
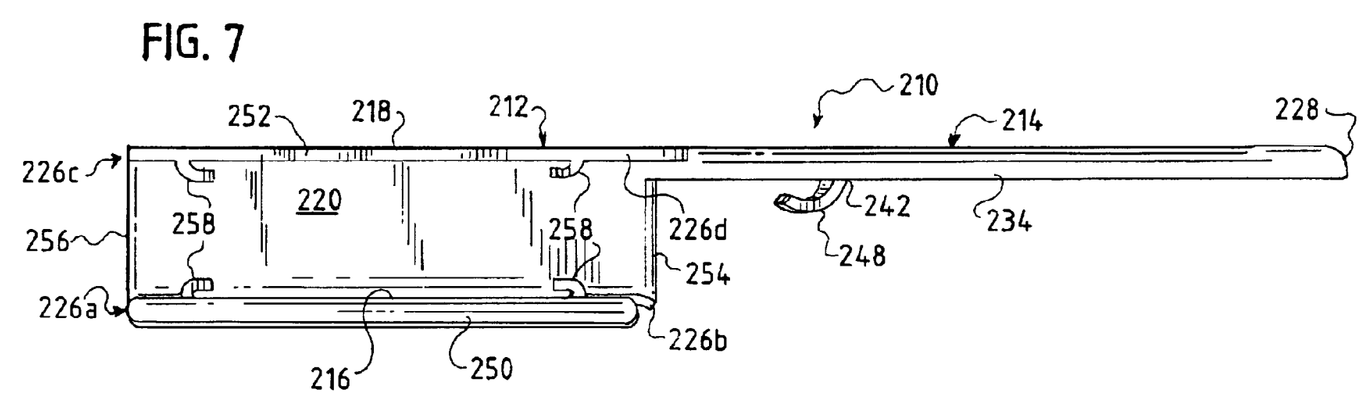
FIG. 7 is a side elevational view of the drop-wire clamp of FIG. 6.

Referring to FIGS. 6 and 7, a one-piece clamp 210 is illustrated embodying features of the present invention. The alternate clamp 210 includes a body 212 having an integrally extending hanger 214. The body 212 includes a first elongated side wall 216 and a second elongated side wall 218 interconnected by an elongated base wall 220. The walls 216, 218 and 220 define a cavity or trough 222 that is sized to accept in a generally loose fitting fashion a conventional signal-carrying cable, such as the cable 24 or 124 discussed above for the two-piece clamps 10 and 110. The first side wall 216 includes a rear notch 226a and a front notch 226b. The second side wall 218 includes a rear notch 226c, and optionally, it may include a front notch 226d. The notches 226a–c (and notch 226d when present) open in a direction designed to facilitate expeditious and effective securement of a cable in the clamp 210. The wire hanger 214 includes a loop 228 that enables the clamp 210 to be easily suspended from a hook or other conventional attachment to structure, such as a pole or building.

More specifically, the clamp 210 can be employed to support and direct, in a suspended fashion, a cable, such as cable 24 (which is a double-stranded cable with a signal-carrying wire and an attached support wire or messenger wire). A cable is attached to the clamp 210 is the same manner as to the previously discussed two-piece clamps 10 and 110. That is, for example, a separated portion of the messenger wire is wound along the body 212 using the notches 226a–c (and, optionally, notch 226d when present) to maintain the wire in position relative to the body 212. Due to the positioning, orientation and configuration of the notches 226a–c (and notch 226d when present), the winding of the separated messenger wire portion can be accomplished quickly and efficiently without having to shift the clamp 210 and wire portion from hand-to-hand. Moreover, as discussed above for the two-piece clamps, a variety a winding patterns between the separated messenger wire portion and the notches 226a–c (and notch 226d when present) can be employed in securing a cable in clamp 210.

The hanger 214 extends from the front of the body 212. More specifically, the hanger 214 extends integrally from the second elongated side wall 218 and includes two parallel extensions 234 that terminate at the loop 228. Each of the extensions 234 has an L-shaped cross-section formed by an inner side 234a being generally perpendicular to an outer side 234b. The loop 228 can have a generally circular cross-section. This construction adds strength to the hanger 214.

As mentioned above, the body 212 includes the first side wall 216 and the second side wall 218, which are interconnected by the base wall 220 to from the trough 222 that receives a cable, such as cable 24. The trough 222 has an elongated shape that is longer than its opening through which a cable, such as cable 24, is inserted into the trough 222. The walls 216, 218 and 220 are generally parallel and perpendicular to one another. As mentioned above, the trough 222 is to be sized large enough to receive a cable in a loose fashion so as not to damage or otherwise effect the signal-carrying ability of the cable. The two extensions 234 and the loop 228 form an elongated, generally oval configured gap 260. At the rear of the gap, there is an arcuate edge 242. More specifically, the arcuate edge 242 curves back towards the body 212 to from a loop. The loop can take on any cross-section, and as illustrated has a circular cross-section. The arcuate edge 242 is also curved as it extends between the two extensions 234. The arcuate edge 242 also includes an outer arcuate surface 248 that guides the separated portion of the messenger wire or other securing wire back around to be wound about the body 212 using the notches 226a–c (and notch 226d when present) to secure a cable in the trough 222.

The elongated opening of the trough 222 is bounded by a first elongated side edge 250 of the first side wall 216 and a second elongated side edge 252 of the second side wall 218. The first elongated edge 250 is curved outward from the trough 222. This outward curvature assists in inserting a cable into the trough 222 and in winding, locating and securing the separated portion of a messenger or other securing wire. The second elongated edge 252 may be in the same plane as the second side wall 218 or can also be curved outward for the same reasons.

The ends of the trough 222 are bounded by front edge 254 and rear edge 256. The front edge 254 traces the front end of the trough 222 at the first and base walls 216 and 220 and curves outward from the trough 222. The rear edge 256 traces the rear end of the trough 222 at the first, second and base walls 216, 218 and 220 and also curves outward from the trough 222. The end edges 254 and 256 are curved so as to minimize potential for damage to the cable.

The front edge 254 defines one notch 226b in the first side wall 216 adjacent the first elongated side edge 250 of the first side wall 216. The rear edge 256 defines one notch 226a in the first side wall 216 adjacent the first elongated side edge 250 of the first side wall 216 and another notch 226c in the second side wall 218 adjacent the second elongated side edge 252 of the second side wall 218. Each of these notches 226a–226c are sized sufficiently large enough to receive at least two windings of a conventional messenger or other securing wire and have a slightly rectangular shape extending longitudinally. In addition, when present, the side edge 252 defines the front notch 226d in the second side wall 218 adjacent the rear portion of the hanger 214.

Each of the notches 226a–c (and notch 226d when present) includes an arcuate flange 258 at its end that curves inward into the trough 222 and longitudinally along the elongated direction of the body 212. The flanges 258 guide a separated messenger or other securing wire through the notches 226a (and notch 226d when present) and provide a smooth surface upon which to wind the wire so as not to damage the wire. The wire wrapping patterns discussed above for the two-piece clamps 10 and 110 apply to the one-piece clamp 210 as well.

It will be understood that various changes in the details, materials, and arrangements of parts and components which have been herein described and illustrated in order to explain the nature of the invention may be made by those skilled in the art within the principle and scope of the invention as expressed in the appended claims.

What is claimed is:

1. A method to secure a double-stranded cable, which includes a signal-carrying strand and a support strand, to a clamp, which consists of a body portion and a hanger portion, the body portion contains a trough with an opening, the method comprising:

separating a length of the support strand from the signal-carrying strand;

holding the body portion of the clamp with one hand;

inserting the double-stranded cable into the trough through the opening;

using the other hand to complete a wrapping procedure that extends the separated support wire through a plurality of notches in the body along the trough without alternating the body portion between hands, that closes off the opening of the trough such that the signal-carrying strand cannot release from the trough and where the support strand does not encircle the back of the trough.

2. A method according to claim 1 wherein the plurality of notches are generally oriented in the direction of a longitudinal axis of the trough and the wrapping procedure further comprises extending the separated support wire through the plurality of notches, which are generally oriented in the direction of the longitudinal axis of the trough.

3. A method according to claim 2 wherein the trough terminates with a pair of distal edges, one or both of the distal edges define the plurality of notches and the wrapping procedure further comprises extending the separated support wire through the plurality of notches which are defined by one or both of the distal edges.

4. A method according to claim 3 wherein each distal edge defines at least one notch and the wrapping procedure further comprises extending the separated support wire through at least one notch defined by each distal edge.

5. A method according to claim 3 wherein each distal edge defines at least two notches and the wrapping procedure further comprises- extending the separated support wire through at least two notches defined by each distal edge.

6. A method according to claim 1 wherein the hanger portion is integral with the body portion.

7. A method according to claim 1 wherein the trough has a longer length than width, the plurality of notches are generally oriented in the direction along the length of the trough, and the wrapping procedure further comprises extending the separated support wire through the plurality of notches which are oriented generally along the length of the trough.

8. A method according to claim 1 wherein the plurality of notches have a portion extending generally in the direction of a longitudinal axis of the trough and the wrapping procedure further comprises extending the separated support wire through the plurality of notches which have the portion extending generally in the direction of the longitudinal axis of the trough.

* * * * *